UNITED STATES PATENT OFFICE.

FRANKLIN S. CLARK, OF CHARLESTON, SOUTH CAROLINA.

PINE-OIL PRODUCT.

SPECIFICATION forming part of Letters Patent No. 390,452, dated October 2, 1888.

Application filed November 10, 1887. Serial No. 254,757. (Specimens.)

*To all whom it may concern:*

Be it known that I, FRANKLIN S. CLARK, of Charleston, South Carolina, have invented a new and useful Pine-Oil Product, of which the following is a full, true, and exact description.

The process herein described results in a purification of the pine-oil and the production of a new product from the same. The oil upon which the process is to be applied is the pine-oil resulting from the distillation of yellow or long-leaf pine wood, (*Pinus palustris.*) This oil has a specific gravity of .970 to 1.030, is of a deep-red to black color, and of a sirupy consistency when cold. This oil should be well separated from the aqueous distillate resulting from the distillation of the pine wood, and then subjected to fractional distillation in an iron still over a free fire, which still may be of any of the known forms, and should be provided with a fractional separating apparatus. The object of this distillation is to separate this pine-oil into two distinct portions, the first of which is fluid and thin-flowing, while the second is very viscous. In order to accomplish this result, the fire is started at about 220° Fahrenheit. The first distillate passes over. This consists of water, wood, alcohol, acetic acid, and a yellow oil. The heating is continued until water ceases to come over in the distillate. From this portion the yellow oil may be separated by gravity. The heating is continued until about forty per cent. of the original pine-oil is passed over, which will happen at a temperature of about 540°, when this portion is cut off and the portion passing off at a higher temperature is treated differently, and will form the subject-matter of a separate application. The point of separation between this lighter and heavier oil will not be very marked in an ordinary iron still; but in a glass fractional still the rapid increase in specific gravity at 540° will readily be noticed. The fraction so obtained of from about 220° to about 540° Fahrenheit has a specific gravity of .897 and a yellow color, which turns darker upon exposure to the air. It tends to thicken and resinify when exposed to the air, due, probably, to the absorption of oxygen. It has an unpleasant odor, due partly to phenyloid bodies, but especially to a small quantity (about four per cent.) of a volatile oil, with a very penetrating and repulsive odor. In order to purify the oil, it is necessary to remove the guaiacol and creosol oils, which is effected by a thorough agitation of the above oil, which of course is thoroughly separated from any water with ten per cent. by volume, of a 1.1 specific-gravity solution of caustic soda in the cold, either by blowing air through it or using a mechanical agitator. Agitation is kept up one-half hour and the liquid is allowed to settle. The lower layer of caustic soda holding creosote and allied bodies is separated from the remaining oil and is ready for a further treatment in the same vessel. In order to carry out this treatment, the vessel is provided at its upper part with a delivery-pipe connected with any efficient form of fractioning apparatus, and this in turn connects with a small condenser. The contents of the agitator are now subjected to a fractional distillation to remove only the bodies which pass over at or under 300°, or as near that temperature as practicable. The heat may be supplied by a steam-coil with steam at high pressure. The result of this operation is that the oil in the agitator is to a great extent freed from the volatile and bad-smelling oil, this latter passing off through the fractioning apparatus. The strong-smelling oil thus separated leaves the oil in the agitator with a much milder odor. This volatile oil constitutes about two per cent. of the oil in the agitator; but the part rejected in the subsequent treatments will make in all about four per cent. The oil remaining in the agitator is run into a copper still supplied with a pipe and also with a perforated coil, and is here treated with two per cent. of 1.250 caustic-soda solution. The steam is applied by the tight coil to thoroughly mingle the oil and soda solution, and a small percentage of the bad-smelling oil (should any remain) may also be allowed to escape at this stage of the process. Steam is then applied through the perforated coil and a regular distillation ensues, yielding an oil slightly yellow in color and much milder in odor than the original, and at the end of the distillation is more or less turbid, due to suspended water, but clears by standing in the ordinary way.

In this and the following distillations the last part of the oil driven over—say from three to four per cent.—may be separated and distilled again with the succeeding lots to be distilled. It is now again pumped into an agitator similar to the first and treated by agitation in the cold with five per cent. of 1.4 specific-gravity caustic-soda solution. The agitation is kept up about one-half an hour and separation is made as before. It may now be fractioned as before, rejecting a small percentage of the evil-smelling oil, (if any there be,) and is run into a copper still, treated as before with 1.5 per cent. 1.45 specific-gravity caustic soda, and again distilled. It will now pass over nearly, if not quite, colorless, any turbidity disappearing on settling. It is now submitted to a last treatment in the agitator of three-per-cent 1.5 caustic soda, and finally distilled with one-per-cent. 1.6 specific-gravity caustic-soda solution. If after one of the treatments in the agitator the oil is agitated with a weak sulphuric acid, it will be somewhat improved. The final product obtained is substantially water-white, free or nearly free from odor, and has but little tendency to resinify or become colored. By blowing air through as a final operation any remaining odor is removed. This oil or spirits is now capable of being applied to all the uses of turpentine. It has over turpentine the two advantages of being free from objectionable odor and having a higher flashing-point.

The product so obtained is different from any before known, and can be, when properly made, determined by the following tests: First, if soaked in paper it can be completely volatilized without leaving a spot; second, when volatilized from a dish it leaves a slight resinous residue, and the odor is not disagreeable; third, it burns with a sooty flame; fourth, it boils at about 326° Fahrenheit when slowly heated on a sand bath, but the temperature of boiling gradually rises as volatilization continues; fifth, its specific gravity at 68° Fahrenheit is .856; sixth, mixed with alcohol ninety-five per cent. strong it separates into two layers; seventh, shaken with concentrated nitric acid the latter turns black, leaving the oil reddish, and a slight elevation of temperature ensues, but no violent reaction; eighth, tincture of iodine does not appreciably affect it, and there is no rise of temperature when shaking the two together; ninth, hydrochloric-acid gas passed through the oil does not appear to form a crystalline compound, but gives a camphoraceous odor; tenth, both strong sulphuric and hydrochloric acids tend to blacken it; eleventh, neither common nor glacial acetic acid dissolves it.

The following tests distinguish it from turpentine: When to it one half its volume of oil of vitriol is added, there is formed a lower slightly yellow layer, a middle red-brown layer, and an upper layer of the oil itself. By gentle agitation the lower layer of oil of vitriol turns dark-red brown to black and the upper oil layer separates slowly, and after complete separation is dark red to brown. A slight heating ensues from the shaking, but only a little vapor is given off. Upon now adding water the liquid turns light brown to drab, and no tarry precipitate remains. Oil of turpentine, on the contrary, shows the following reaction with one-half its volume of oil of vitriol: At first three layers form—the lower full yellow, the middle red brown, and the upper colorless. Upon gently shaking the lower layer turns black with a red border and the upper layer separates quickly and is yellow. So much heat is evolved by the shaking that vapors are given off and bubbles pass continually upward. The yellow layer by further shaking or standing turns dark. Upon adding water the liquid turns brown, and usually a tarry precipitate is found in the test-tube in which the test has been made. With gum-dammar the oil or spirit of this application shows such superior solvent properties to turpentine as to offer a distinguishing test. With equal amounts of this oil and turpentine and equal amounts of gum-dammar, test being made by occasionally shaking for one-half hour in the cold and then one-half hour slightly warm, the solvent capacity of the new oil is about double that of turpentine, and with said gum the new oil or spirit gives a clear solution, while the turpentine gives a cloudy solution.

I do not in this application claim the process herein specified, having made application therefor June 21, 1886, Serial No. 205,778.

What I claim as my invention, and desire to secure by Letters Patent, is—

The product herein described, consisting of an oily body having the following characteristics: If soaked in paper, it can be completely volatilized without leaving a spot; when volatilized from a dish, it leaves a slight resinous residue and the odor is not disagreeable; it burns with a sooty flame; it boils at about 326° Fahrenheit when slowly heated on a sand bath, but the temperature of boiling gradually rises as volatilization continues; its specific gravity at 68° Fahrenheit is approximately .856; mixed with alcohol ninety-five per cent. strong it separates into two layers; shaken with concentrated nitric acid the latter turns black, leaving the oil reddish; a slight elevation of temperature ensues, but no violent reaction; tincture of iodine does not appreciably affect it, and there is no rise of temperature when shaking the two together; hydrochloric-acid gas passed through the oil does not appear to form a crystalline compound, but gives a camphoraceous odor; both strong sulphuric and hydrochloric acids tends to blacken it; neither common nor glacial acetic acid dissolves it; when to it one-half its volume of oil of vitriol is added, there is formed a lower slightly yellow layer, a middle red-brown layer, and an upper layer of the oil itself; by gentle agitation the lower layer of oil of vitriol turns dark-red brown to black and the upper oil layer separates slowly and after complete separation is dark red to brown; upon now adding water the liquid turns light brown to drab and no tarry precipitate remains, substantially as described.

In testimony whereof I have signed my name to this specification in the presence of two subscribing witnesses.

FRANKLIN S. CLARK.

Witnesses:
 H. COUTANT,
 ANTHONY GREF.